(12) United States Patent
Babieno et al.

(10) Patent No.: US 10,500,488 B2
(45) Date of Patent: Dec. 10, 2019

(54) METHOD OF SIMULTANEOUS PLAYING IN SINGLE-PLAYER VIDEO GAMES

(71) Applicant: BLOOBER TEAM S.A., Cracow (PL)

(72) Inventors: Piotr Babieno, Cracow (PL); Konrad Rekieć, Cracow (PL)

(73) Assignee: BLOOBER TEAM S.A., Cracow (PL)

( * ) Notice: Subject to any disclaimer, the term of this patent is extended or adjusted under 35 U.S.C. 154(b) by 24 days.

(21) Appl. No.: 15/326,389

(22) PCT Filed: Mar. 30, 2016

(86) PCT No.: PCT/PL2016/000035
§ 371 (c)(1),
(2) Date: Jan. 13, 2017

(87) PCT Pub. No.: WO2017/171567
PCT Pub. Date: Oct. 5, 2017

(65) Prior Publication Data
US 2018/0207524 A1 Jul. 26, 2018

(51) Int. Cl.
*A63F 13/25* (2014.01)
*A63F 13/42* (2014.01)
*A63F 13/56* (2014.01)
*A63F 13/822* (2014.01)
*A63F 13/40* (2014.01)

(52) U.S. Cl.
CPC .............. *A63F 13/25* (2014.09); *A63F 13/42* (2014.09); *A63F 13/56* (2014.09); *A63F 13/822* (2014.09); *A63F 13/40* (2014.09); *A63F 2300/6054* (2013.01); *A63F 2300/6623* (2013.01)

(58) Field of Classification Search
CPC .......... A63F 13/00; A63F 13/25; A63F 13/40; A63F 13/42
USPC .......................................... 463/1, 30, 31, 36
See application file for complete search history.

(56) References Cited

U.S. PATENT DOCUMENTS

| 5,411,270 | A |   | 5/1995 | Naka et al. |   |
|---|---|---|---|---|---|
| 5,498,002 | A | * | 3/1996 | Gechter | A63F 13/10 463/31 |
| 5,498,003 | A | * | 3/1996 | Gechter | A63F 13/52 463/1 |
| 7,559,834 | B1 |   | 7/2009 | York |   |

(Continued)

FOREIGN PATENT DOCUMENTS

| EP | 1078665 A1 | 2/2001 |
|---|---|---|
| EP | 1228794 A2 | 8/2002 |
| EP | 1584362 A2 | 10/2005 |

*Primary Examiner* — Chase E Leichliter
(74) *Attorney, Agent, or Firm* — Andrew Malarz, Esq.

(57) ABSTRACT

The invention relates to the method of simultaneous playing in video games designed for a single player. The invention is realized with a computer unit and uses at least one display device, at least one computer device that generates the game image display and at least one game controller controlled by the user. The method of controlling the figure according to the invention is characterized in that the player using one controller simultaneously controls at least two characters (1), (2) while each of the characters controlled by the same user is displayed simultaneously in a separate viewport (6), (7), which makes a separate story universe (A), (B) and the input signal from the controller is transformed by the software synchronization layer including predefined modifiers specific for a given story universe (A), (B).

5 Claims, 8 Drawing Sheets

(56) References Cited

U.S. PATENT DOCUMENTS

Figure 1:
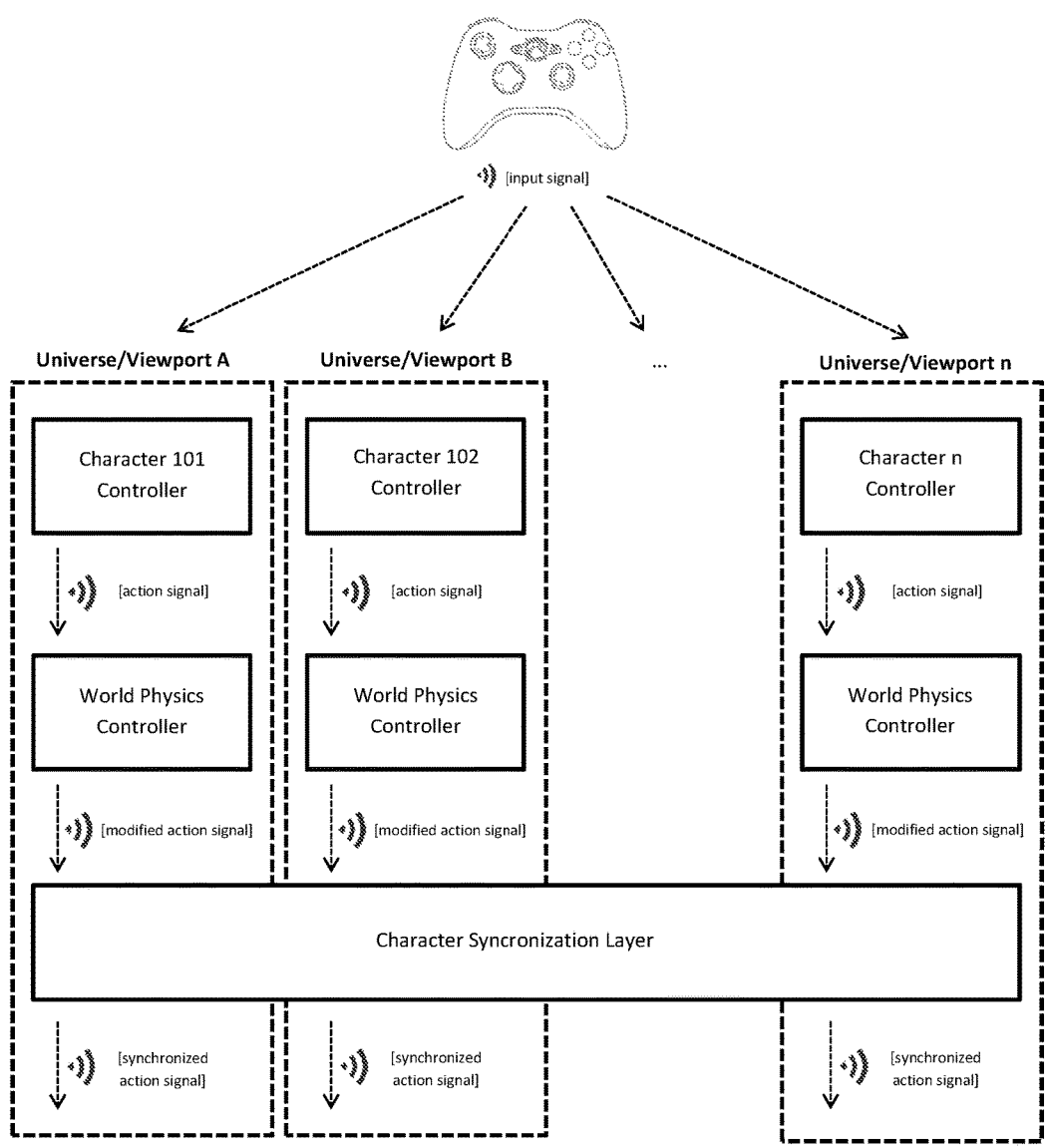

| | | | |
|---|---|---|---|
| 7,594,847 B1 | 9/2009 | York et al. | |
| 8,231,466 B2 | 7/2012 | Tokita et al. | |
| 8,365,076 B2 * | 1/2013 | Hamilton, II | A63F 13/12 |
| | | | 715/706 |
| 8,944,911 B2 | 2/2015 | Avent et al. | |
| 9,192,860 B2 * | 11/2015 | Shuster | A63F 13/12 |
| 2002/0034979 A1 | 3/2002 | Yamamoto | |
| 2003/0190940 A1 * | 10/2003 | Gordon | A63F 13/005 |
| | | | 463/9 |
| 2003/0207704 A1 * | 11/2003 | Takahashi | A63F 13/10 |
| | | | 463/1 |
| 2005/0119050 A1 * | 6/2005 | Suzuki | A63F 13/10 |
| | | | 463/36 |
| 2006/0123351 A1 * | 6/2006 | Littlefield | G06F 3/0481 |
| | | | 715/768 |
| 2006/0258462 A1 * | 11/2006 | Cheng | G07F 17/32 |
| | | | 463/42 |
| 2008/0119268 A1 * | 5/2008 | Kando | A63F 13/00 |
| | | | 463/31 |
| 2008/0158232 A1 | 7/2008 | Shuster | |
| 2009/0199095 A1 * | 8/2009 | Nicol, II | G06F 3/0481 |
| | | | 715/704 |
| 2009/0244376 A1 * | 10/2009 | Asano | G03B 21/26 |
| | | | 348/564 |
| 2011/0131510 A1 * | 6/2011 | DeLuca | A63F 13/63 |
| | | | 715/757 |
| 2012/0069131 A1 * | 3/2012 | Abelow | G06Q 10/067 |
| | | | 348/14.01 |
| 2015/0080122 A1 * | 3/2015 | Motokura | A63F 13/22 |
| | | | 463/31 |
| 2015/0080123 A1 * | 3/2015 | Motokura | A63F 13/69 |
| | | | 463/31 |

* cited by examiner

METHOD OF SIMULTANEOUS PLAYING IN SINGLE-PLAYER VIDEO GAMES

FIELD OF THE INVENTION

The subject of the invention is an innovation from the field of electronic video gaming designed for a single player. The invention relates simultaneous playing in a video game and controlling the character in games for single players, especially story-based, adventure and narrative games, so-called role playing games. The invention is designed particularly for use in games focused on the story and creating the mood and specific atmosphere of the presented world. The invention assumes the use of a computer device consisting of at least one physical display or a substitution device, e.g. virtual reality goggles, at least one controller and at least one computer unit to generate the view of the game. Due to its specifics, the invention can be used in any type of graphical environments, both two-dimensional, three-dimensional and any others.

PRIOR ART

In the prior art there are video games focused mainly on an interesting and captivating story, so-called storytelling games. In this type of games, the player is engaged in the gradually developing story, while playing in subsequent game episodes that are usually published at intervals, like in the case of the seasons of TV series. So far the storytelling games and their associated types, such as adventure and narrative games (RPG) have been played on a single display and the plot has been developed usually in a single story universe. Even if the plot relates to a plot taking place in different virtual universes, it is only possible to switch from one story world to another.

Splitting of the screen or displaying game contents on two screens applies in the prior art to secondary, supplementary or technical issues, such as displaying various functions, capabilities of the figure controlled by the player, equipment, map, etc, in a popup window. Therefore, such viewports are statistic in nature as compared to the main screen. In the prior art, in single-player games, the player using a single controller directs only one character per time and this character is existing in a single universe at the same time. Games that have been produced so far, using split viewports, provided the users with an option to use additional screens but only as statistical fields of the whole screen, e.g. as a menu with a choice of weapon, clothing, special skills, etc., or, as a screen on which the player can follow the actions of an opponent. While in the known multi-player games, individual screens present the actions of characters controlled by other players in such a way that one screen, usually physical, is assigned to one player controlling a single figure.

Splitting the screen between several characters controlled by different players is known from games for video consoles and such system is referred to as "split screen". In such type of solutions, a part of the screen is assigned to a character controlled by player A and another part of the screen is assigned to a character controller by player B; while all characters are placed in the same virtual universe.

There are also known solutions, in which one player controls two characters or a group of several characters by switching from one character to another. In such type of games (for example Lego® MARVEL® Super Heroes®), the player controls one of the characters, while the computer and implemented scripts control the rest of characters placed in the player's team. However, in such solution only a single character can be controlled directly by the player at one time.

Another solution found in the video game entitled "Brothers: A Tale of Two Sons®" produced by Starbreeze AB includes one controller used by the player to control two characters, but they exist in the same story universe.

The U.S. patent US005411270 presents a method of playing a multiplayer game using a screen split into areas assigned to individual characters controlled by different players. The discussed invention solves the problem with independence of separated areas due to different movement speed of characters and shifting (scrolling) the game map. The solution is realized by showing on the same screen two independent game areas, in which a scrolled viewport is displayed. While on each area the character controlled by a single player is displayed. At the same time, scrolling of the viewport section in one of the areas is independent of scrolling in another section.

Splitting of the screen into characters controlled by different players using the same physical display is also known from the U.S. Pat. No. 7,559,834. In this solution, the number of viewports isolated in the game equals the number of players. When the computer processor detects a connected controller, the processor automatically isolates a panel (viewport) on the display that constitutes a gaming field assigned to a given character controlled by the player joining the game.

There are also video game devices known that are able to process the image with effective use of multiple screens. For example, the U.S. Pat. No. 8,231,466 presents a gaming device containing two screens, to which different areas of the same game are assigned to. The viewport is split into several screens in such a way that each of the screens displays only a part of the gaming field.

Splitting of the screen into two parts in single-player games is known from the published U.S. Pat. No. 8,944,911. The discussed solution relates to the exchange of information about the position of the avatars of individual players in the virtual world, particularly in platform games.

Problem Solved by the Invention

The problem solved by this invention is increasing the amount of information transmitted to the player by the game per time unit. Increasing the amount of information transmitted to the player in relation to the game story strengthens the engagement of the player and attracts player's attention more. Additionally, increasing the amount of transmitted contents results in better personalization of the player with the controlled character. This invention allows intensification of game story experiencing by multiplication of the number of universes, in which game action and story are developed. Additionally, it allows presentation of the same story screen in different aspects, e.g. in a real frame crop and at the same time in a phantasmagorical or abstract framing.

The invention using a software synchronization layer solves the problem with controlling multiple characters present in several story universes of the same game by a single player using one control device—character controller. The synchronization layer of software allows implementation of different sets of environment conditions of the story presented in individual universes in the game.

The method of playing the game according to the invention is a response to the needs related to deeper experiencing of the story by players. This way, the invention satisfies the needs of customers looking for ambitious, educating and captivating games, while ensuring the highest quality of graphics, sound and other functionalities integrated with the advanced technology allowing simultaneous playing on one, two or more physical screens by a single player. At the same time, the story of the game is displayed in at least two isolated areas, called viewports. Within the games based on the method of playing according to the invention, the users are provided with a product that is a combination of a narrative story, game and interactive project with unique technology and mechanisms. The new model of communication with the user, interaction and narrative has been so far unknown in the market and in the gaming industry. The invention offers the players a different, so far unknown, model of video gaming.

SOLUTION SUMMARY

The key feature of the invention is the way of playing in a video game for a single player, involving simultaneous controlling of several character avatars placed in several virtual realities that constitute separately presented story universes. The essence of the solution includes algorithms related to an innovative method of simultaneous control of virtual avatars of characters placed in two or more virtual worlds. These algorithms relate, among others, to the relationships between parallel worlds, in which a game is played, as well as interactions between the character (avatar) and the environment of the game story.

The essence of the method of simultaneous game playing by a single player on two or more screens according to the invention involves one player using one controller to control simultaneously one character with several avatars placed in two or more virtual worlds at the same time. Decisions taken in one world have consequences on character's functioning and development of the plot in other virtual worlds generated by the game. Information gathered by one of the character's avatars in one of the presented worlds may also influence the development of story and events in a different world of the game. This way, creating a network of relationships and conditions between the story worlds presented in the game. Mechanisms allowing such game playing are additionally correlated with proper sound, which strengthens the effect and experiences of the player by increasing player's engagement in the story of the game. Thanks to the introduction of several simultaneous and parallel stories, the game according to the invention, thanks to its unique mechanics, provides the player with a feeling of being a part of the game worlds living independent of the player and changing simultaneously, which responds even to the highest requirements of advanced and demanding players.

The player controls the character existing simultaneously in several realities, which are simultaneously displayed in isolated areas of one or more physical screens (monitors). The areas may be isolated both horizontally and vertically, as well as in any other arrangement. Apart from specially directed situations, the character is displayed in both worlds simultaneously. At the same time, it is possible to display in isolated viewports particularly important frames from a given world of the game in order to turn the player's attention to important elements of the game.

The movement and behavior of the avatars of the character controlled by the player are modified by the software synchronization layer. The software synchronization layer is a module of the computer software that adjusts the behavior of the character controlled by the player respective to the conditions of a given story universe. This layer ensures that the same signal from the controller is properly modified and in the output phase, the avatar of the character (game hero) in each viewport may behave differently. While the output behavior of the character is coordinated. The synchronization layer acts as a coordinator, which modifies the output effects eventually for all avatars so that the keep the assumed synchronization rules. The modifiers of character behavior are introduced to the synchronization layer on the game creation stage and can be different for each of the universes presented in the game. For example, modifiers can depend on a story point, character properties, current position of the controlled character in the world of the game, etc. The use of a synchronization layer allows independent development of the story in each of the presented universes.

The activity of the synchronization layer impacts transforming of the controller signal into character avatar movements in the game. The input signal sent by the controller is propagated to all avatars representing the game character controlled by the player. Next, the software module that controls the character, referred to as the "Character Controller", transforms the input signal upon a command (signal) to perform a specific action (action signal). The Character Controller decides what action should be performed by a given avatar in response to the commanded input signal from the controller. For example, in response to the left analog control stick of the controller being moved right, the avatar runs to the right with a speed of 3 m/s in the real world. Then, the Character Controller sends an action signal through the avatar to the software module containing the conditions related to the environment (surroundings), in which the story is presented. Next, the software module referred to as the World Physics Controller assigned to a given universe of the game transforms the action signal into a modified action signal by modifying the action signal based on the conditions of a given story environment in the universe where the avatar is located. For example, environments that impact avatar behavior can be water, marshland, slippery surface, dense jungle, etc. Environment conditions can for example influence the speed or way of avatar's moving, e.g. by jumping, crawling, etc. The World Physics Controller is assigned to a given universe and takes into account the environment when the avatar performs the commanded action. For example—if there is a wall on the avatar's right, the avatar reaches toward the wall instead of running. Then, the controller signal modified by the Character Controller and World Physics Controller software modules carrying the information about the action to be performed by a given avatar with consideration of its properties and environment conditions within a given universe is transferred to the software synchronization layer. The synchronization layer transforms the modified action signal into a synchronized action signal while allowing all avatars to perform a given action. While this action in the output phase can be different for each avatar. For example, the input signal from the controller that commands the avatar to move to the right can be processed so that one of the avatars will make a jump, another one will run and still other will climb a vertical obstacle. The conditions of synchronization of avatars' movement are assigned and dedicated to a given game and story presented in the game.

The Character Synchronization Layer software performs an analysis of the status of each character avatar and environment present in all story worlds, while keeping the position and status and properties of all avatars. This software module is adjusted to the conditions and modifiers of the story environment predefined for a given game and presented universes.

The use of the software synchronization layer implies the necessity to display at least two viewports. Optionally, such setting and behavior of cameras and viewports is directed and programmed on the game creation and software writing stage. The player can only have the minimum control over this aspect of the game, e.g. make slight camera movements to look around in a scene. Additional viewports are used to control the player's attention, allowing the player to focus on important elements of the environment by framing to a specific element. The viewports can be present on one physical monitor or be assigned to several separate image display devices, such as: monitors or virtual reality goggles.

The story plot in several universes requires also specific operation of the sound system. The main characters can hear the sounds from several domains, but they are also filtered and controlled according to the rules set in the synchronization layer. This eliminates undesired chaos and additionally it helps the player to keep the orientation in the environment.

Implementation of the invention in any game first requires preparation of graphic materials (concepts, storyboards, models, textures, etc.) and sound materials required to generate the worlds of the game and its individual levels. Next, the grids of worlds present in the game must be prepared separately. Then, in the scenes of individual worlds of the game so-called cameras are arranged, i.e. points of perspective to be from which the player observes the controlled character and the virtual world. These points are directed for specific frames and assigned to specific views. Individual cameras display the image only from one world specified by the designer. Each of the worlds has its own physics that can be independent of the physics of the other worlds of the game. In both worlds so-called triggers are arranged that activate changes of cameras and viewports. The activator of the triggers is the character, displayed independently of the rendering layer. Individual stages of the game are prepared with the use of ready information technology tools. All virtual universes assumed in the story of the game and generated by the computer device are separated and differently interpreted by assigning their cameras only when the game is launched. In the world of the game generated by the computer device virtual activators (triggers) of camera changes are arranged.

Next, a synchronization layer containing modifiers of character behavior depending on the story course, game universe, character development stage, character specifics, location for a given scene or other criteria assumed in a given game is sort of applied on individual worlds.

FIGURE, DESCRIPTION OF FIGURES

Figure 2:
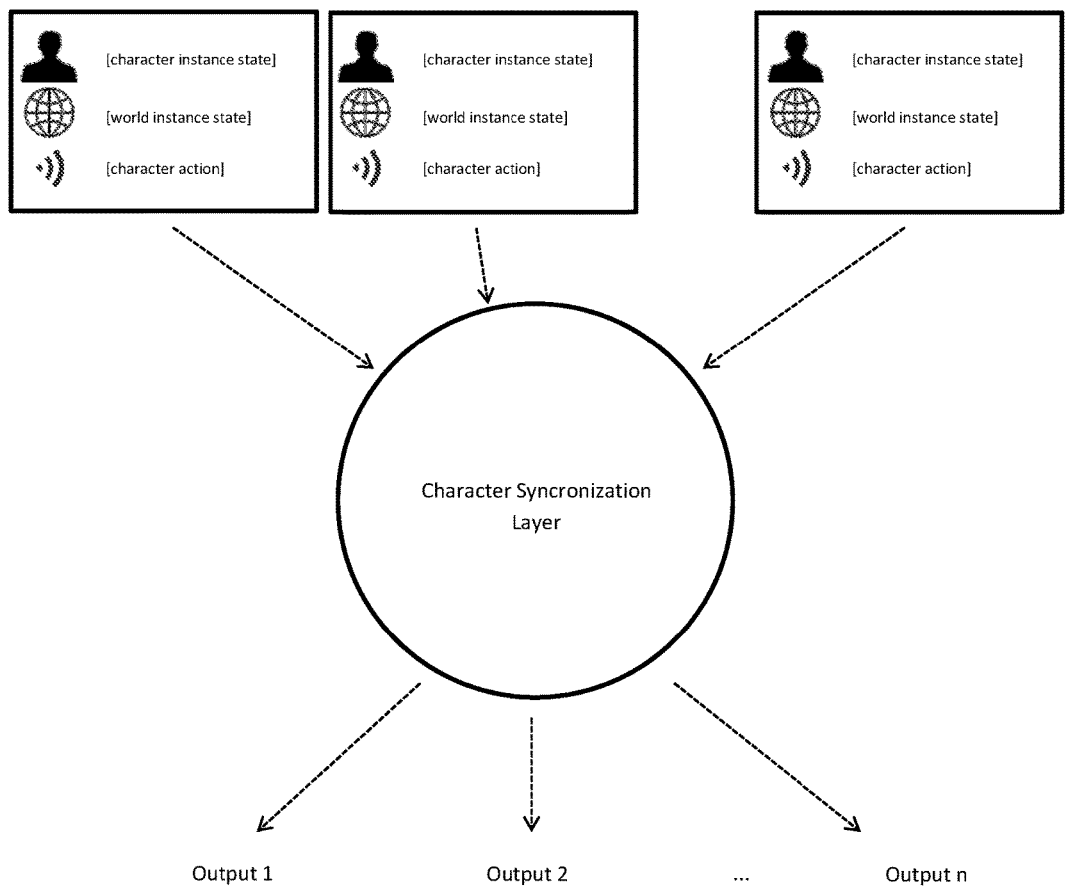
Figure 3:
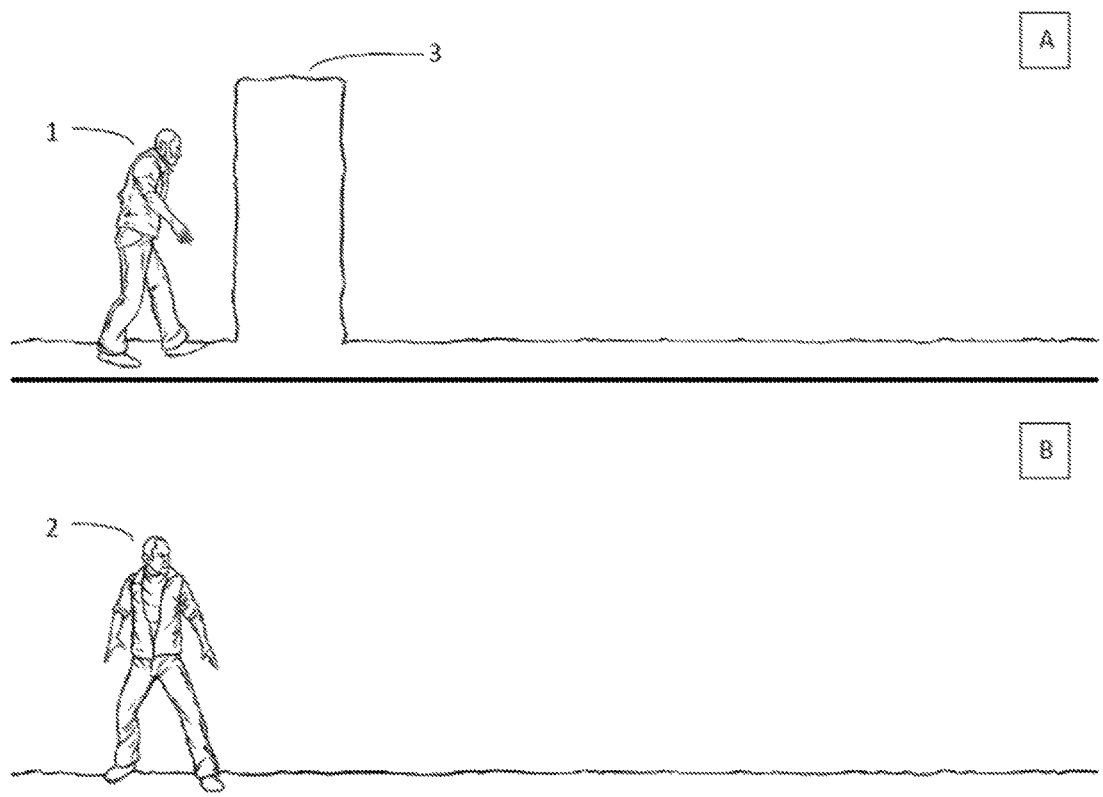
Figure 4:
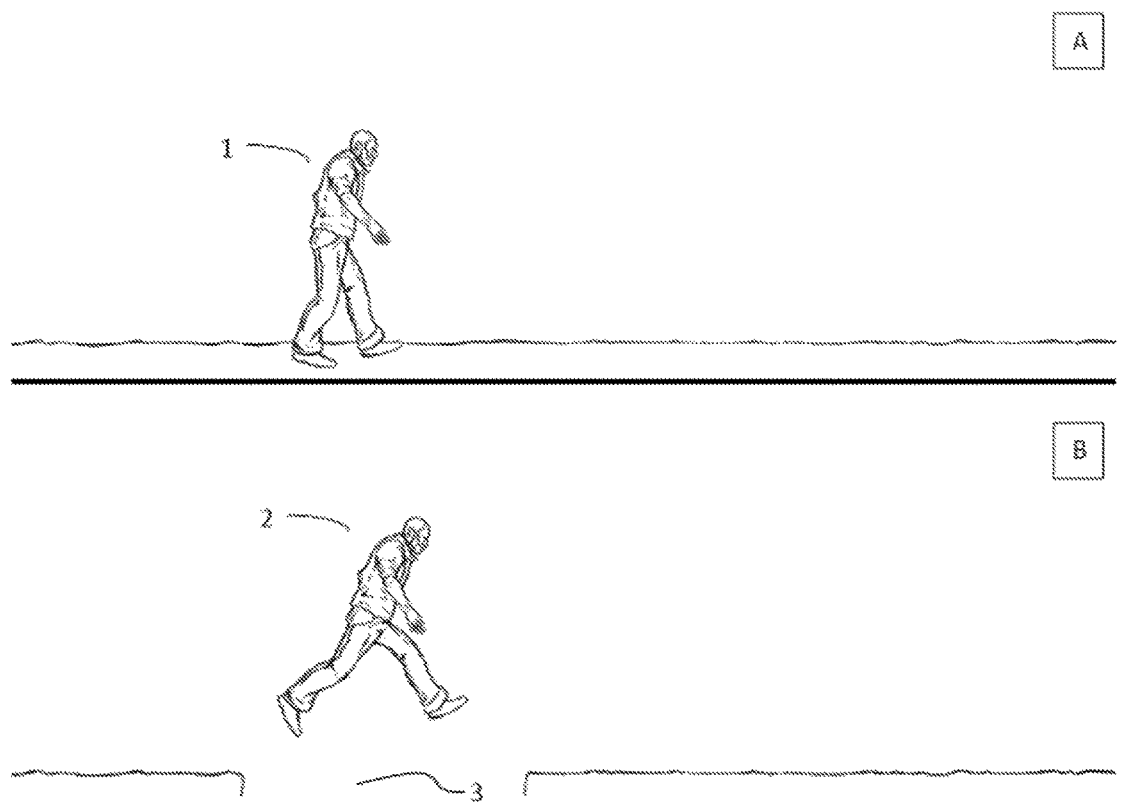
Figure 5:
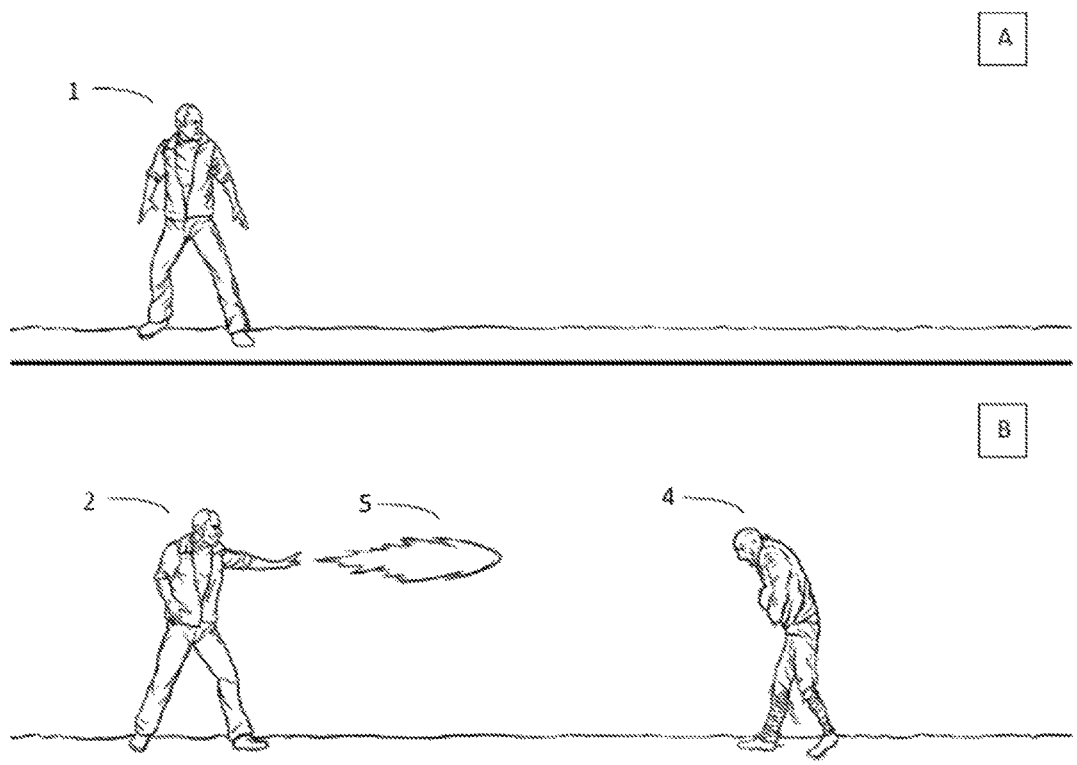
Figure 6:
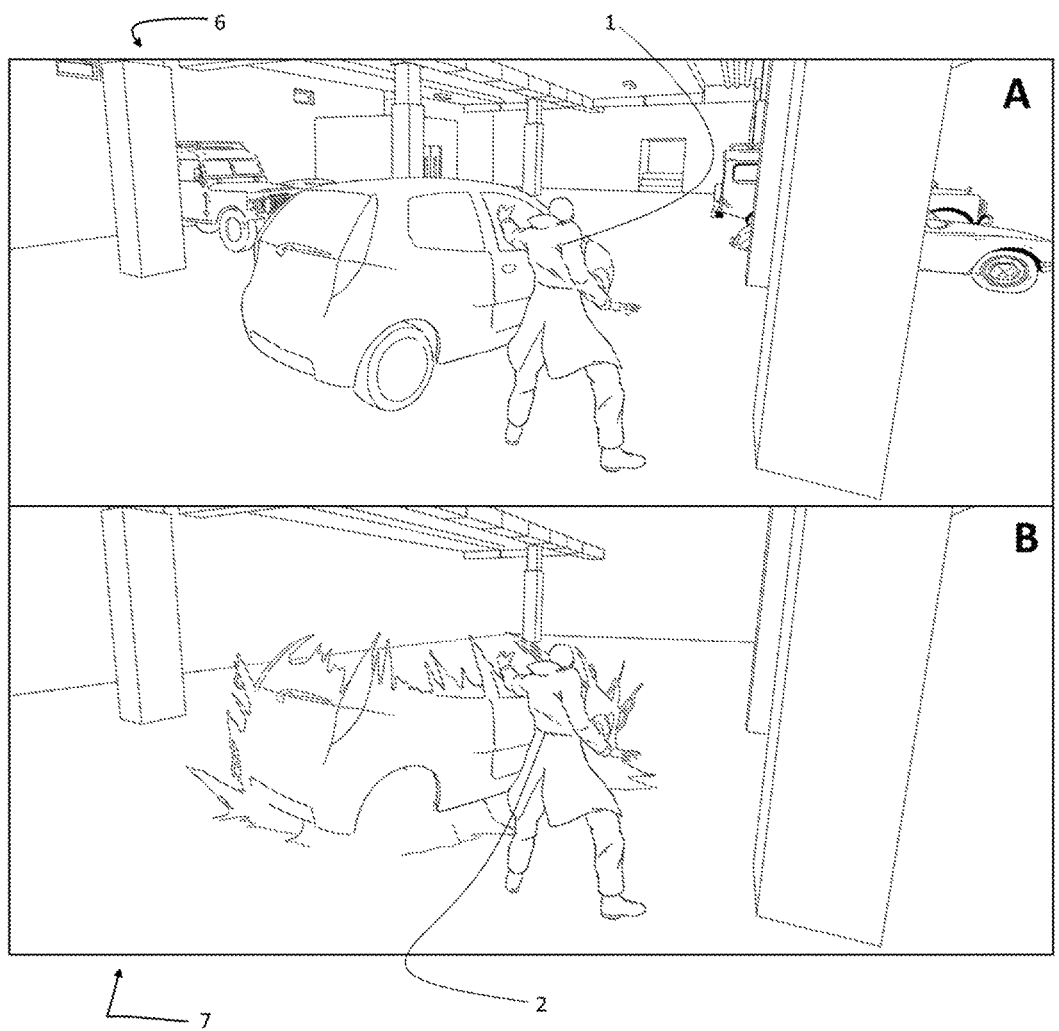
Figure 7:
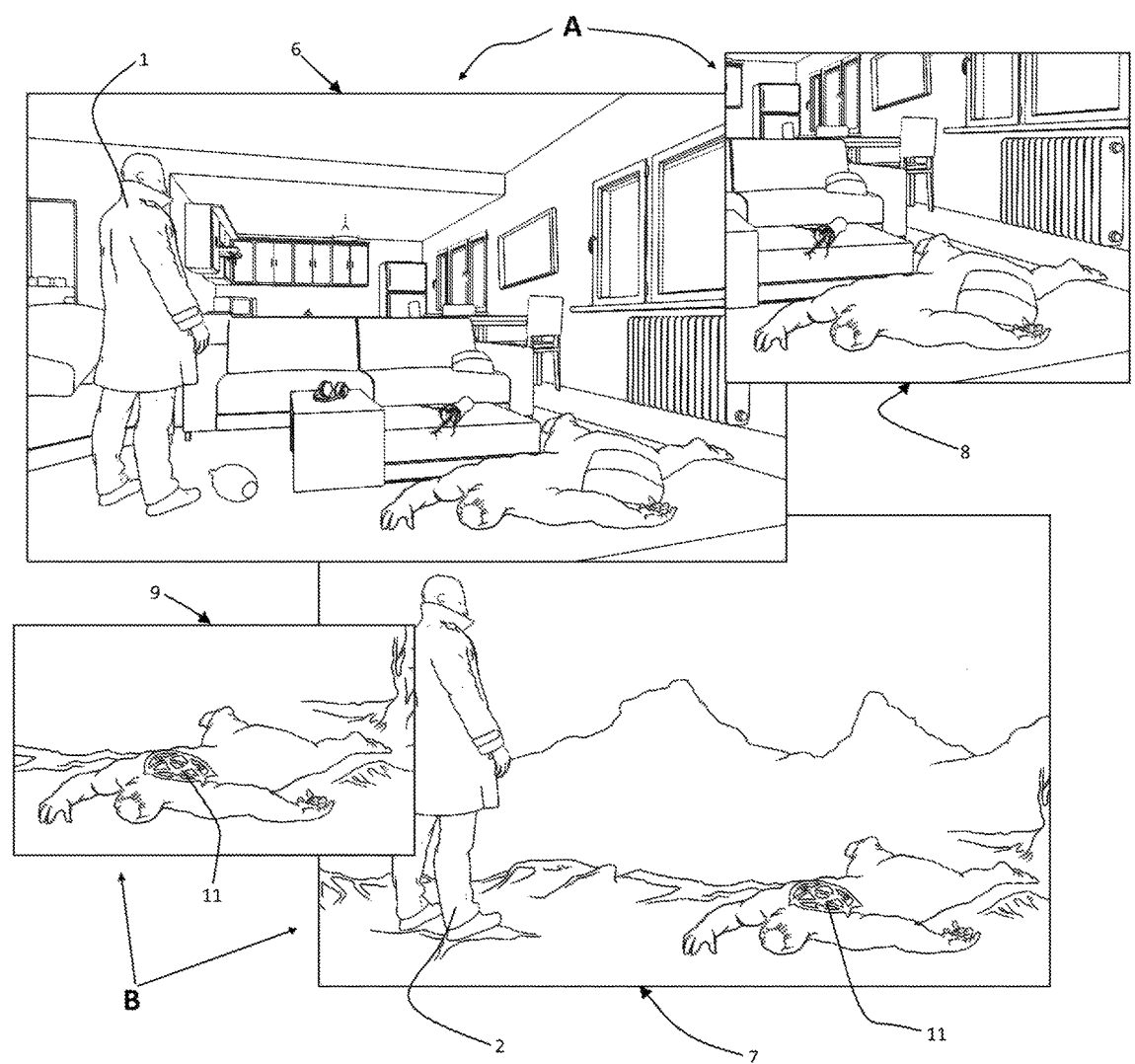
Figure 8A:
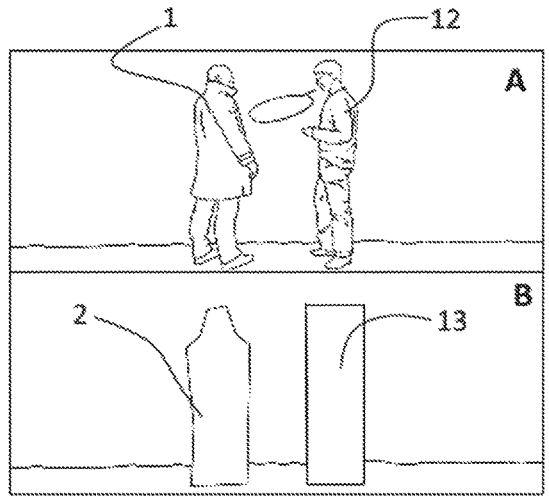
Figure 8B:
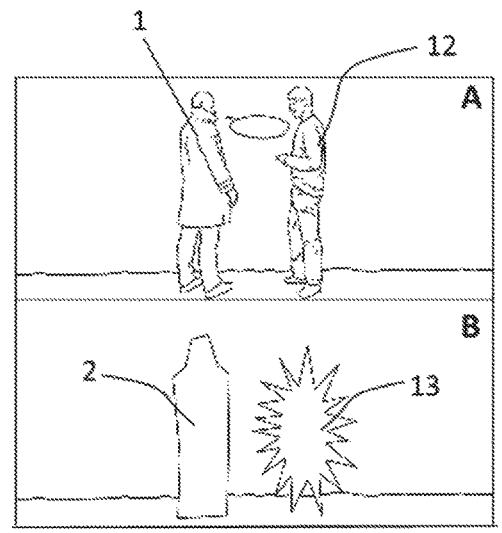
Figure 8C:
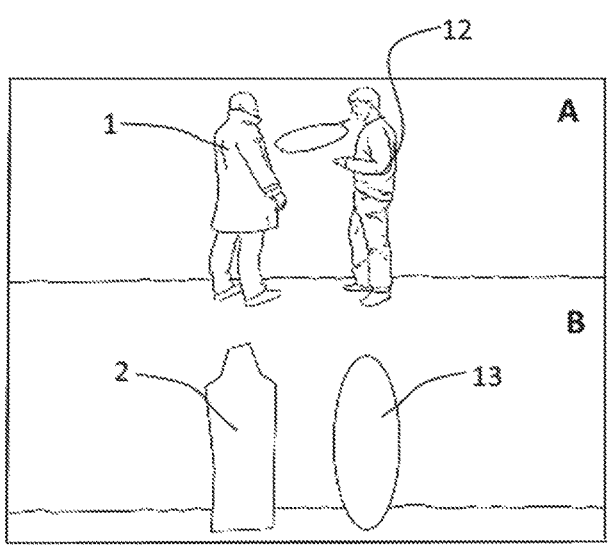

A method of simultaneous playing of a single-player game on two or more screens has been presented in the embodiments on figures, where FIG. 1 presents a flowchart of simultaneous control with the use of one device (character controller), within one game, a character in the first avatar located in universe A and the second avatar located in universe B and the third avatar located in universe N; FIG. 2 presents a flowchart of the working of the synchronization layer transforming specific input data; FIG. 3 illustrates the influence of the synchronization layer on character's behavior and animation, in two universes of the same game, in case of an occurrence of an exemplary vertical obstacle in the form of a wall; FIG. 4 illustrates one of the possible variants of the influence of the synchronization layer on character's behavior and animation, in two universes of the same game, in case of an occurrence of an exemplary obstacle in the form of a hole; FIG. 5 illustrates another of the possible variants of the influence of the synchronization layer on character's behavior and animation, in two universes of the same game, in a fight scene; FIG. 6 presents an exemplary story scene in a game with implementation of the invention, in which the character is presented in the real and phantasmagorical world; FIG. 7 presents an exemplary story scene in a game with implementation of the invention with additional viewports, in which the character presented in the real and phantasmagorical world finds a dead body; FIG. 8A, FIG. 8B, FIG. 8c present a schematic interaction of the character with a story character met in the game and the influence of information obtained in world B on the interactions occurring in world A.

EMBODIMENTS

The method of simultaneous playing of a game by a single player on two or more screens with the use of a software synchronization layer has been presented in several exemplary situations that may occur as a result of controlling the movement of the character to the right.

In the first embodiment presented on FIG. 3 one screen displays two worlds rendered in two horizontally separated frames that constitute viewports A and B, in which the character controlled by the player has its separate representation, respectively as avatars 1 and 2. Both avatars react to a signal sent from the player's controller and go to the right. The avatar from world A finds obstacle 3 on its way and stops. The synchronization layer causes that the avatar in world B cannot go further either. Due to the missing obstacle in its world B, animation controlled by the synchronization layer presents avatar 2 standing in place, although there is no obstacle, while in the case of avatar 1, it is an animation of the reaction to an obstacle.

In the second embodiment presented on FIG. 4 one screen displays two worlds rendered in two horizontally separated frames, being viewports A and B, in which the character controlled by the player has its separate representation, respectively as avatars 1 and 2. The avatar 2 from world B finds an obstacle 3 in the form of a deep hole that the player decides to jump over. The synchronization layer causes that avatar 1 in world A marches through the distance covered by avatar 2 with a jump. Due to the missing obstacle in universe A, avatar 1 moves with the walking animation.

In the third embodiment presented on FIG. 5 one screen displays two worlds rendered in two horizontally separated frames, being viewports A and B, in which the character controlled by the player has its separate representation, respectively as avatars 1 and 2. Avatar 2 from world B meets an opponent 4, which the player decides to attack with a bolt of energy 5. This skill is available only for avatar 2 in world B, this way the synchronization layer causes that avatar 1 in world A reacts only with idle animation.

The fourth embodiment presents exemplary scenes from a 3D game that implements this invention. In the fourth embodiment of the implemented invention presented on FIG. 6 and FIG. 7, the game takes place in two alternative realities A, B represented by two worlds distinguished with different graphic styles and often different physical structure. The main character represented by two avatars 1, 2 is present in both worlds A, B simultaneously through most of the play and visible on one physical screen at least in two viewports 6, 7, one per world. The comic style applied for the method of presentation of viewports (virtual screens) often allows using additional viewports 8, 9 presenting the same scene from different perspectives or with the use of different framing or zooming.

The game takes place simultaneously in the real world and phantasmagorical world. An ambitious and hypnotizing story will allow the player to fully engage in the game, causing doubled emotions resulting from several viewports related to parallel virtual worlds A, B where the story takes place. The player controls the character represented by two avatars 1, 2 having paranormal skills and being a medium. While the paranormal skills can be only used in the phantasmagorical world B.

In the scene presented on FIG. 7, the character controlled by the player enters an apartment. There is a scene with marks of fighting. After a few steps, the character finds a dead body 10 on the floor, which is covered with symbols 11 that emit light in the phantasmagorical world B and are not visible in the reality world A. The scene is prepared so that after the development of the scene in three dimensions based on sketches and conceptual graphics, scene directing and implementation is started. The scene is prepared twice—for the reality world A and for the spiritual universe B. Both worlds are built one on another in separate layers in order to keep the coherence easily. Avatars 1 and 2 personalizing the character controlled by the player are shown in separate viewports, presentation of which can be arranged in any way required for the predefined story points. Additionally, organization of the presented viewports in individual storyline points can change.

From a technical point of view, the activators of framing changes or displaying additional viewports or changing their arrangement are virtual locations (points), distributed in the game scene and invisible to the player, which, unlike the statistical items visible for the player, let the character go with a simultaneous reaction on the contact with the programmed effect. In response to such events, specific predefined actions are activated—including scene view change, zooming in to a specific detail or starting a specific sound or interaction of the character with the environment.

In the fifth embodiment of the invention presented on FIG. 8A, FIG. 8B, FIG. 8C, in world A, avatar 1 is represented as in earlier embodiments—as a man operating in the world that is a reflection of the real world. The character can use dialogs and interact with other characters from the world of the game. While in world B that constitutes and illustration of the phantasmagorical world, only a mixture of colors and shapes can be seen. Avatar 2 controlled by the player is only a spot, which moves among other spots. While in world A there is a conversation or other type of interaction with an independent character 12 controlled by the game, shapes 13 in world B, in a position corresponding to the position of the independent character 12 in world A, change depending on the selection of dialogue options in the world A, this way giving the player a hint related to the mode and correctness of interaction control. The player can establish a dialogue or participate in other interaction as avatar 1 in world A, while observing the impact of the actions or selected dialogue options on the other character in world B. Therefore, the player receives guide hints and tips from world B as related to the correct choice of actions in world A.

Advantages

The solution according to the invention allows advanced and ambitious gaming, as it requires more concentration from the player. The increased level of player's concentration has been confirmed in observations and research of player's behavior. Managing the active character in a few viewports at the same time is challenging and requires more concentration and engagement from the player.

While the story can relate to many situations that occur in the life or any person, but can be observed from a different perspective. While the parallel worlds, in which the character controlled by the player and synchronized way of playing the game in several virtual worlds are to help the player understand subjectivity of each observation. At the same time, it is worth to note that this type of an interactive scenario would not have a chance to be realized without the functional and technological solution involving simultaneous game playing in several viewports. Doubling the emphasis on player's engagement in the story and plot about the character results from the fact that the two screens present different realities, however, related to the same game.

The storyline and narrative carried out parallel in several universes of the same game allows full player's engagement in the game, causing more experiencing as a consequence of placing the game story in several worlds shown in several viewports. Games implementing the method according to the invention may refer to the ideas of perception of different choices in life and the applied aesthetics supplements and co-creates the game scenario planned by the designers.

Games with the implemented method of game playing of a single player in two or more viewports according to the invention show significantly higher gameplay capabilities than traditional games. Splitting the story into several worlds with a feedback between them requires more concentration and intellectual effort, which influences enhancing of experiences related to the game. Increased intensity and amount of information sent to the player by the game and multi-layered story allows creating logical and practical riddles based on elements contained in individual worlds of the story. It is also possible to use multiple relationships between the parallel story elements. For example, tips required to solve a specific riddle can be placed in a different world than the universe where the riddle is present. Multiple avatars of the character controlled by the player allow multi-dimensional perception of the reality presented in the game, which, in turn, allows different interpretations of the realities. Information that the player receives in the form of a kaleidoscope of viewports allows looking on the problem from various perspectives and requires combining all collected information into a whole.

The invention claimed is:

1. A method of simultaneous playing in single-player games, with a storyline and narrative, realized with a use of a computer device, using at least one device for image display, at least one computer device to generate game images and at least one game controller controlled by a player characterized in that the player using one controller controls simultaneously at least two characters (1), (2), wherein each of the characters controlled by the same player acts in a different story universe simultaneously displayed in a separate viewport (6), (7), which makes a separate story universe (A), (B) and an input signal sent from the controller is transformed by a synchronization layer involving predefined modifiers different for each given story universe (A), (B), wherein action taken by the character (1), (2) in one story universe have consequences on character's (1), (2) functioning and development of a plot in other story universe (A), (B) generated by the game, and wherein an output signal executed by given character (A), (B) depends on three groups of modifiers assigned to the character, assigned to the given story universe, and assigned to the synchronization layer which synchronizes movement of all characters (1), (2).

2. The method of simultaneous playing in single-player games according to claim 1, characterized in that attention of the player is focused on particularly important elements of a story (10), (11) in the virtual world by cropping of scene parts in additional viewports (8), (9).

3. The method of simultaneous playing in single-player games according to claim 1, characterized in that information contained in one of the story universes (B) presented in a separate viewport (9) includes tips related to a way of further developing the storyline presented in a different story world (A).

4. The method of simultaneous playing in single-player games according to claim 1, characterized in that the viewports 6, 7 are displayed on the same physical device for image display.

5. The method of simultaneous playing in single-player games according to claim 1, characterized in that each of the viewports 6, 7 can be displayed on a different image display device.

* * * * *